E. H. MOYLE.
MORTAR FOR STAMP MILLS.
APPLICATION FILED SEPT. 26, 1904.

1,121,117.

Patented Dec. 15, 1914.
5 SHEETS—SHEET 1.

WITNESSES
G. H. Hooper
J. E. Schweng

INVENTOR
Edward Henry Moyle

E. H. MOYLE.
MORTAR FOR STAMP MILLS.
APPLICATION FILED SEPT. 26, 1904.

1,121,117.

Patented Dec. 15, 1914.
5 SHEETS—SHEET 3.

WITNESSES:

INVENTOR
Edward Henry Moyle.

E. H. MOYLE.
MORTAR FOR STAMP MILLS.
APPLICATION FILED SEPT. 26, 1904.

1,121,117.

Patented Dec. 15, 1914.
5 SHEETS—SHEET 4.

WITNESSES:

INVENTOR,
Edward Henry Moyle.
BY
Townsend, Lyon, Hackley & Knight
ATTORNEYS

E. H. MOYLE.
MORTAR FOR STAMP MILLS.
APPLICATION FILED SEPT. 26, 1904.

1,121,117.

Patented Dec. 15, 1914.
5 SHEETS—SHEET 5.

UNITED STATES PATENT OFFICE.

EDWARD HENRY MOYLE, OF LOS ANGELES, CALIFORNIA.

MORTAR FOR STAMP-MILLS.

1,121,117. Specification of Letters Patent. Patented Dec. 15, 1914.

Application filed September 26, 1904. Serial No. 225,945.

*To all whom it may concern:*

Be it known that I, EDWARD HENRY MOYLE, a citizen of the United States, residing at Los Angeles, in the county of Los Angeles and State of California, have invented a new and useful Mortar for Stamp-Mills, of which the following is a specification.

My invention relates to certain improvements in mortars, in which ores or like substances are crushed by means of stamps to effect the saving of valuable minerals contained therein.

The principal object of my invention is to provide a mortar, whereby the ore can be fed evenly and uniformly to the die to be crushed, thereby providing for an even wear to the crushing surfaces, and the feeding means to be so located that screens can be placed all around the mortar, each of these screens being protected from the coarse particles of ore which leave the die when the stamp drops; particularly that section of screen which is located farthest from the lip side of mortar, or, nearest the feed side of the mortar.

A further object of my invention is to provide a mortar of the circular screen type, having a back screen, or a screen located at the back of mortar, so that, when "cleaning up" the mortar on the inside, and collecting the values therein, said mortar can be attended to, and new parts placed therein, such as the shoe and die, etc., by taking out the back screen, or that screen farthest from the lip or plate side of mortar, and by so doing, there is little or no necessity for transporting the heavy parts, contained within the mortar, over the copper plates, located on the lip or front side of mortar.

Another object of my invention is to provide a mortar of the circular screen type, whereby the screens and screen frames can be located and fastened around the mortar independently of the chock blocks, and by which said screens and screen frames can be easily and quickly removed, without interfering with the chock blocks and the inner part of the mortar; also a means provided by which the chock blocks and screen frames can be adjusted periodically, as the crushing surface of the stamp and the die wears down, by taking out a section of the chock-block, and that portion of screen frame, to match the change in height of chock-block.

Another object of my invention is to provide a means in the mortar, whereby the ore or like substance, when crushed to a pulp, can be equally divided for screening, I accomplish this by internal projections within the mortar, these projections also prevent the scouring of the amalgam as it accumulates on the copper plates which are fastened to chock-blocks; these internal projections also increase the capacity of the mortar, as the ore when crushed to a size is compelled to seek exit, again, said projections prevent considerably the sliming of the ore; these internal projections when carried up and above the feeding means, can serve to steady the upward and downward motion of the stamp, thereby eliminating considerable vibration.

Another object of my invention is to provide a mortar having the greatest circular screen surface, consistent with durability; and in order to accomplish this end, I provide a base or bottom of mortar having three wall segments or curved side plates with a screen opening in each and a column interposed between each wall segment or curved side plate, these three columns or sections fastened to wall segments or curved side plates and serving to prevent vibration within the mortar and consequent crystallization of the iron, as they are fastened to the base or bottom of mortar.

Another object of my invention is to provide a mortar, having a feeding means, which will hold and distribute the ore, thereby giving the stamp time to again contact the cam in its circular travel and thereby begin to raise said stamp before the core finally reaches the die to be crushed, thereby feeding more evenly; by this system it will prevent the ore being fed to the stamp and reach the die level, while the stamp is still inoperative as commonly accomplished by the present way of feeding through a receptacle or box chute.

Other objects will appear from the following specification.

The accompanying drawings illustrate my invention.

Fig. 5 is a horizontal section on line D—D of Fig. 1 and Fig. 2. This figure shows two of the columns cut back so as to admit parts of stamp E when placing them in the mortar, in other words these two columns do not project inwardly as far as the front columns, however they are intended for the same purpose hereafter explained. Fig. 16 is an elevation of a column, said column being used when that form of base G is used as shown in Fig. 13.

In the drawings G indicates the base of the mortar which is preferably cast in the usual manner and is provided with bolt holes $i$ used for passing bolts $z$ therethrough to hold it in place on the mortar bed.

Figure 13:
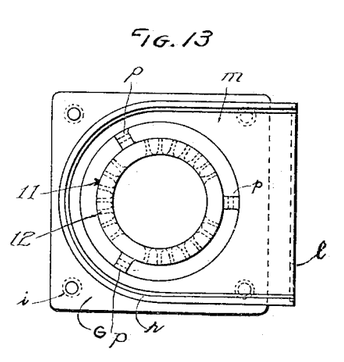
Fig. 13 is a plan of the mortar base G showing the fastening lugs $p$, these lugs are used when constructing the mortar as shown in Figs. 1, 2, 3, 4, 5, 6, 7, and 8.
Figure 14:
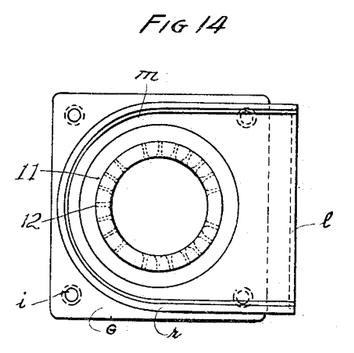
Fig. 14 is a plan of the mortar base G, the fastening lugs being omitted, this base is used when constructing the mortar as shown in Figs. 9 and 10.

The top of the base is provided with a wall or projection 11 shown on Figs. 13 and 14 rising thereabove forming a recess or hollow for the reception of the die M and forming a support for the wall or wall segments or side plates H which are secured thereto in any desirable manner; I have shown these wall segments or side plates as riveted to the wall 11 with rivets K Fig. 7 which pass through holes 12, Figs. 13 and 14. The wall 11 is preferably provided with lugs $p$ arranged equidistant about its outer circumference upon which are seated columns or supports I.

The lower end of the column is provided with a notch or cut 4 the upper wall of which rests upon and is supported by the top part of wall 11. The inner edge of each column is formed as a rib 2 and extends inwardly of the mortar side plates to the stamp face far enough to lie adjacent to the stamp E and thereby forms a loosely fitting guide therefor, and furthermore serves to divide the ore and pulp and prevent it from moving or in circular travel from one side of the stamp to another during the operation.

The columns or supports I are preferably fastened to the wall or wall segments or side plates H by rivets J; these columns or supports and wall or wall segments or side plates H, however could be cast integral with the base G should it be found necessary.

Figure 1:
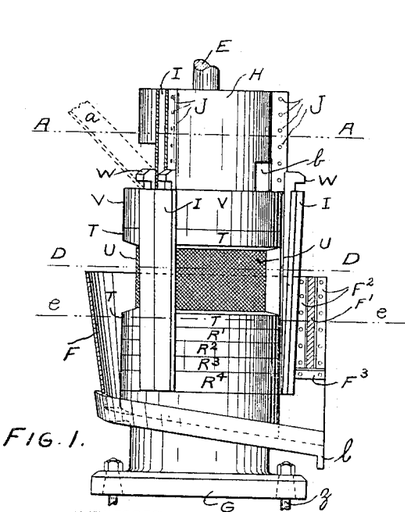
Figure 1 is a side elevation of the mortar embodying my invention, a portion of the splash plate being shown in section.
Figure 2:
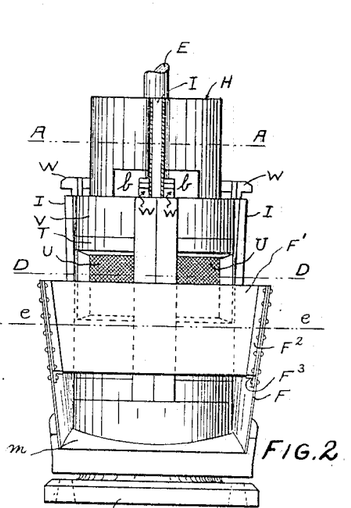
Fig. 2 is an elevation of the discharge side of the mortar.
Figure 3:
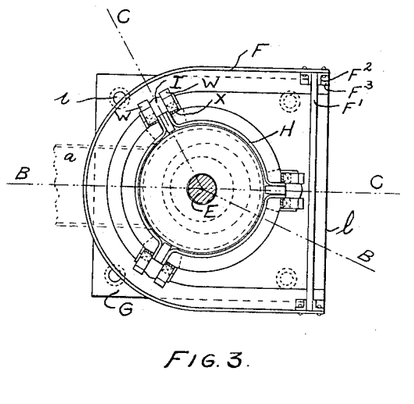
Fig. 3 is a plan view, showing the stamp stem in section.
Figure 4:
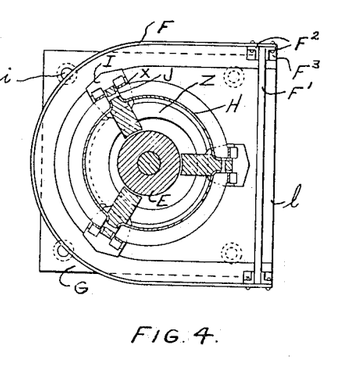
Fig. 4 is a horizontal section on line A—A of Fig. 1 and Fig. 2.
Figure 5:
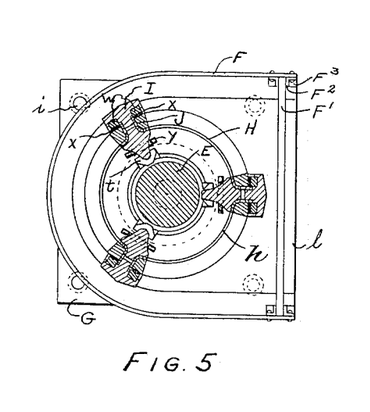
Figure 6:
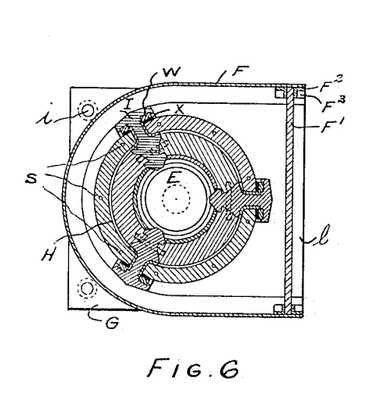
Fig. 6 is a horizontal section on line e—e of Fig. 1, Fig. 2, Fig. 7 and Fig. 8.
Figure 7:
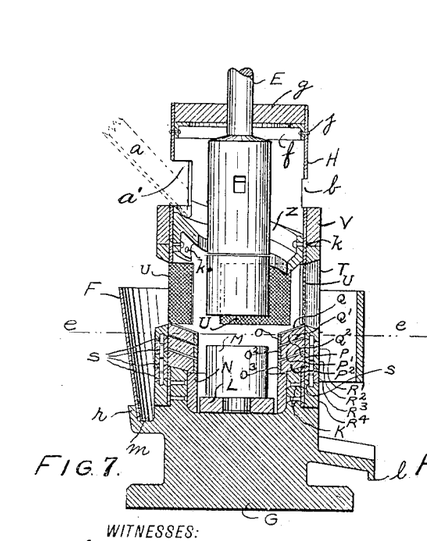
Fig. 7 is a vertical section taken on line B—B of Fig. 3, the stamp E and die M being unsectionalized; in this view certain details of the inner part of the mortar are omitted, for clearness; this view, however could serve to illustrate the inner part of mortar when the inner projecting ribs are omitted as shown by Fig. 10.
Figure 17:
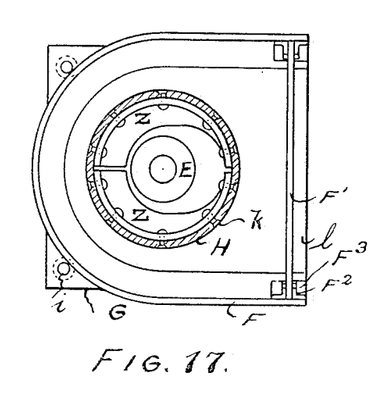
Fig. 17 is a horizontal section through the upper part of the mortar, showing a modified form of the guide.
Figures 18, 19:
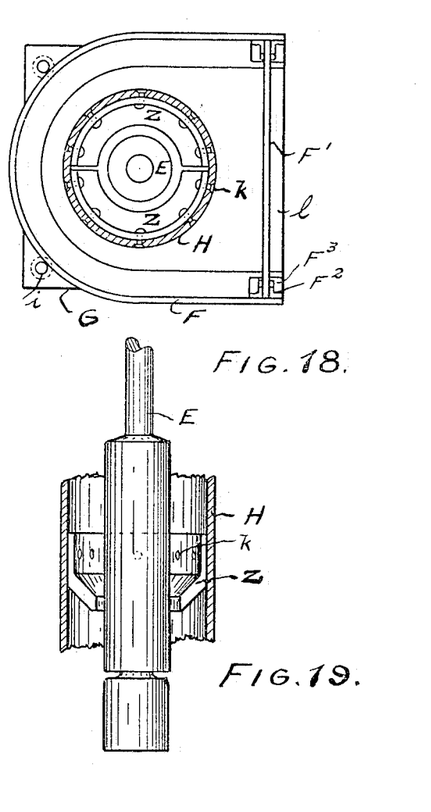
Fig. 18 is a view similar to Fig. 17, showing another form of the ore guide.
Fig. 19 is a vertical section of the form shown in Fig. 18.

An inclined ring or an ore distributing or guiding chute Z is fastened to wall or wall segments or side plates H by rivets $k$ Fig. 7; this ore distributing or guiding chute Z surrounds the stamp E in such a manner as to form a circular feed space around the stamp. This ore distributing or guiding chute Z is preferably inclined in that direction from the feeding end and is also preferably inclined toward the stamp E, see Figs. 7 and 8. The opening in this ore distributing or guiding chute Z is preferably eccentric to the stamp, see Fig. 4, or, the opening in that side nearest the feed entrance for the ore to the mortar is preferably made smaller than the side farthest from the feed entrance. The letter $a$ in Fig. 7 designating a dotted outline of the chute which leads to the feed entrance. The opening in this ore distributing or guiding chute while being eccentric or oblong to the stamp E could be made if found necessary, concentric with the stamp E, as shown in Figs. 18 and 19, or, an opening of an equal distance all around the stamp, or, as shown in Fig. 17, the opening could be made so oblong that, that part farthest from the feed entrance could be made as large as the wall or wall segments or side plates H would permit, the object of this opening being, to feed a certain amount of the ore at the beginning of feed entrance and to feed gradual to the opposite side of feed entrance, thereby feeding continually and evenly to the die M. This will allow the finer ore to pass down at the beginning of the feed entrance and the coarser ore to pass around the stamp E until the ore is large enough to pass through, and by distributing the ore in this way, it is more evenly placed on the die M giving a more effective stamp crushing area, a greater crushing capacity, and a more regular and even discharge of the pulp so crushed, through the screen U. This feeding of the ore more evenly upon the die also prevents considerably, the breaking of that part of stamp E which is smaller than that part which drops on the die M. The guide ring or chute Z is preferably made in sections as shown in Figs. 17, 18 and 19.

Figure 8:
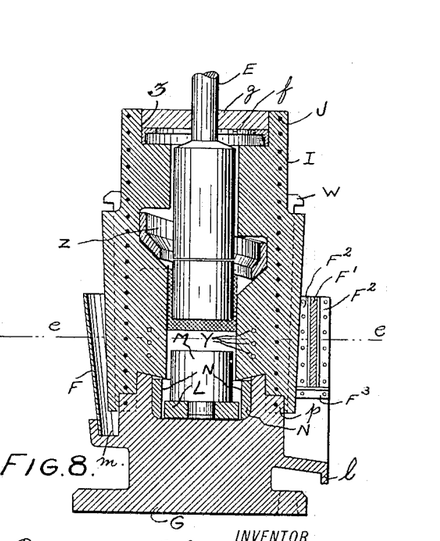
Fig. 8 is a vertical section taken on line C—C of Fig. 3, the stamp E and die M being unsectionalized.
Figure 10:
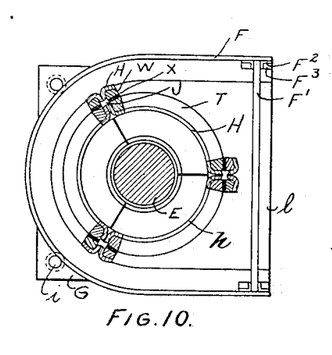
Fig. 10 is a horizontal section through screen frames T which illustrates another form of constructing the curved side plates of the mortar from sheet metal.

In the form of mortar shown in Fig. 8, a cut or seat 7, Fig. 16, is provided in the column or supports I for the arrangement and at a proper height to give the inclined ring or ore distributing or guiding chute Z a slant from one side of the mortar to the other, while in the form of mortar shown in Fig. 10 it would not be necessary as the wall or wall segments or side plates H have no internal projection.

The upper part of column or support I is so notched or cut away as shown at 3 Fig. 16 that when it is fastened to wall segments or side plates H that it provides for a strengthening and bearing ring $f$, preferably made of angle iron, which is fastened to wall segments or side plates H by rivets $j$. A perforated cover plate $g$ may rest upon this bearing ring $f$ and surrounding the stamp to prevent the escape of material when the mill is operated, if such cover is desired and found necessary, however the ore could be fed to the ore distributing or guiding chute Z over the wall segments or side plates H or either through a perforation in cover plate $g$, or the cover plate $g$ could be left off when feeding, as the guide chute Z will prevent the splash of the pulp, created by the drop of the stamp E on the die M. The holes 9 in Fig. 16 are for rivets J.

Figure 15:
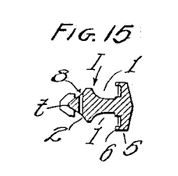
Fig. 15 is a horizontal section of one of the columns I used to fasten and connect the wall segments or curved side plates of the mortar, when the mortar is made in sections, this section taken on line $X^{15}$—$X^{15}$ of Fig. 16.

Columns or supports I are formed on opposite sides with grooves 1 and 1' and with flanges 5 and turned-in extensions 6 as shown in Fig. 15 at the outer edge of the grooves. The wall or wall segments or side plates H are preferably made of sheet metal and are provided with openings $h$ for admitting the pulp to the screen U, these openings being shown in Figs. 5, 6, 7, 9 and 10. The vertical edges of the wall segments or side plates being bent to seat within the grooves 1 and 1' in the columns; and extending below the columns to engage and form a fastening seat embracing the lugs $p$, and fastened by rivets J to standards I when the form of column as shown in Fig. 16 is used. The bottom edges of the wall or wall segments or side plates H embrace the wall 11 on the base and is fastened thereto by rivets K and the upper portion of the wall or wall segments or side plates H is attached to the inclined ring or ore distributing or guiding chute Z and the strengthening and bearing ring $f$. The walls may be attached to the columns, chute, bearing ring and base in any suitable manner, but I have shown them as being held in place by rivets $j$, J, $k$, and K, or said side plates H and columns or supports I may be cast integral with the base.

The grooves 1 and 1' besides seating the bent vertical edges of the walls also serve as a seat for the screen frames T, and its parts V, R', R$^2$, R$^3$ and R$^4$ which covers the openings $h$ in the wall or wall segments or side plates H, and also serves in connection with the flanges 5 and turned-in extensions 6 to afford a key-way for seating the keys W; X is a bearing plate for key W on the edges of the screen frames.

Other forms may suggest themselves to those skilled in the art to assemble the different parts, but in practice I have found riveting of the parts together as above described to be most convenient as the work of assembling may be performed at the place where the mill is to be used.

The openings in the walls extend from the upper edge of the wall 11 to a point just below the ore distributing ring. When a new die is in the hollow, I place chock blocks P, P', P$^2$, etc., in the lower portion of the opening, shown in vertical section, in Fig. 7. These chock blocks conform to the shape of the upper edge of the wall 11, which as shown, is circular, and the top slopes inwardly. The ends of the chock blocks are shaped to fit between that part of the columns I which project inwardly from the line of wall or wall segments or side plates H and these chock blocks are held in position against vertical movement by the pins or keys Y. The outer face of these chock blocks form a line or contact the inner face of screen frame T and its sub or adjusting blocks or plates R' and R$^2$; the outer face of these chock blocks are also on a line with the outer face or exterior of wall segments or side plates H. The adjusting blocks or plates R$^3$ and R$^4$ complete those sections which are below and are removably connected to screen T by dowel pins S. In lowering screen frame T as the die wears down, I remove one of the chock blocks, such as chock block P and adjusting block or plate R' then key or pin the remaining chock blocks to place, and lower screen frame T so that the bottom or lower face will contact upper part of adjusting block or plate R$^2$ and by this means of adjustment, the bottom of screen opening in screen frame T is relatively the same height as when the die was new and first placed, therefore as the die wears further on the other chock blocks such as P' and P² and the other adjusting blocks or plates such as R² and R³ are removed to suit, and while the chock blocks are made as shown, it is also obvious that they could be made wide enough, if necessary, to also serve the purpose of the adjusting blocks or plates.

Chock blocks P, P', and P² have wearing segments O, O², O³ fastened thereon, also copper plates Q, Q', and Q² which are prepared and fastened in the usual manner.

Holes 8, Fig. 15, are provided in the columns or ribs for pins or keys Y to hold the chock blocks from jumping or being disturbed by the rising and falling of the stamp. Dowel pins S may be provided to connect the different adjusting blocks or plates to prevent their displacement or being forced outwardly. The upward faces of the chock blocks are inwardly inclined.

In practice I have found that the inner edge of the top chock block should be slightly above the top of the die to give the screen the proper elevation for the discharge.

The screen frame T is also provided with a follower block or plate V which is used to cover or inclose the upper part of opening in wall segments or side plates H when the screen U and screen frame T is lowered to suit the height of die.

The screen frame T may be formed of wood as by layers of veneer or single pieces, and curved to conform to the contour of the wall segments or side plates. The screen U is secured to the frame in the usual manner. As shown, the screen frame rests upon the sub-blocks R, etc. Each wall or wall segment or side plate H is cut away at the bottom part to form an opening for the escape of pulp through the screen U, giving a triple discharge, or a discharge from each of the chambers into which the mortar space is divided by the ribs on the columns or supports I.

To prevent wear of the mortar inside the hollow for the die, I provide a removable wearing ring N which may be made segmental for ready replacement when desired. M is the die which is preferably seated on a plate L which is provided with an opening to receive a lug on the lower side of the die. The die plate L being made to fit inside the ring N and the ring N fitting snugly inside the wall 11 and under the rib of column I affords sufficient support to keep the die in the center of the hollow. Sand or other packing being then placed around the die and plate, holds the die securely in place.

The die and die plate may be formed integral if so desired, but for convenience and cheapness in manufacture I prefer to make them separately.

Extending around the base of the mortar is a launder m which conveys the water and pulp away from the mortar escaping through the screens and is discharged over the lip l. The launder wall r which is preferably slightly inclined outwardly supports a curved splash plate or apron F, extending around the mortar but with its ends separated to form a discharge opening. I arrange a straight removable front piece F' between the ends of the curved splash plate F, preferably a wooden board which may slide between cleats or guides F² F² and resting upon stops F³. The ends of front piece F' of the splash plate are tapered to suit outward inclination of curved splash plate F and acts as a spreader to hold the curved splash plate F open and against the launder wall r of the launder m to keep it in place. By removing the front piece F' from between the ends of the curved splash plate F the same may be sprung inwardly and removed from the launder to afford access to the mortar. The launder wall r may also contain holes so located, by which curved splash plate F may be fastened by bolts if necessary. This splash plate F and front piece F' can be used for fastening copper plates, as well as assists considerably in saving the values.

a is a feed chute for supplying ore onto ore distributing or guiding chute Z at the highest part thereof; said ore distributing or guiding chute arranged to receive ore through an opening a' (Fig. 7) in one of the wall segments or side plates H near the upper end of said wall, preferably the rear wall and directly above the highest part of said ore distributing or guiding chute.

b is a sight or hand opening through which the feeding is visible, and for attention, such as for removal of over size ore, said opening being preferably at the front of the mortar. The feeding of the ore could also be observed when the perforated cover plate g is omitted.

Figure 9:
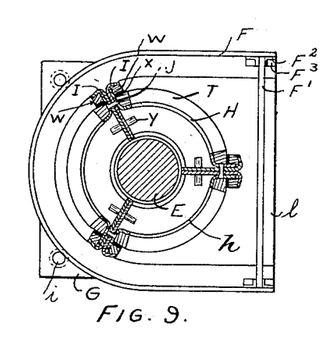
Fig. 9 is a horizontal section through screen frames T showing the construction of the curved side plates of the mortar when made of steel plate material.

In stead of constructing the mortar as above described, certain changes or modifications can be made in certain of the parts or elements. For instance the columns or supports I can be formed from a plurality of plates set side by side and arranged radially to the center of the mortar, as shown in Fig. 9. In this structure the outer edges of the plates taking the place of the columns are bent laterally opposite to each other and then inwardly a short distance to form the key-seat. The edges of the plates forming the sides of the mortar are flanged as in the former structure and secured to plates forming the columns or supports in the same manner as to the solid or unitary support.

In the form of mortar shown in Fig. 10, the columns are omitted entirely and the edges of the wall segments or side plates H are riveted together flatwise and bent laterally in opposite directions beyond the rivets to form the key-seats. In this construction there is no inwardly-projecting portion, and the chock blocks would abut against each other at their ends, but the ends of the screen frames and of the adjusting blocks or plates would rest against the flanged portions of the side plates H as in the other forms.

Figure 11:
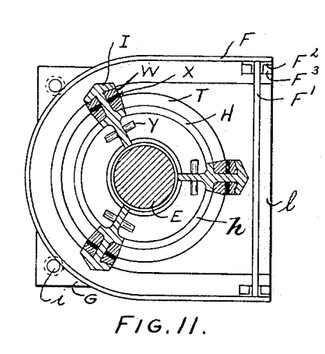
Fig. 11 is a horizontal section through screen frames T which illustrates another form of the mortar having the columns I and wall segments or curved side plates H cast integral with the base G.

In Fig. 11, the side plates H of the mortar and the columns I are formed integral, in which case the side plates H are substantially cylindrical with internal and external ribs arranged longitudinally thereof, the internal ribs forming the stem and ore guide and chock-block fastener, and the external ribs forming the key-seats. The side plates of this cylinder are provided with holes or openings between the ribs for the discharge of the pulp and for the passage of the interior parts in the same manner as with the sectional wall.

Figure 12:
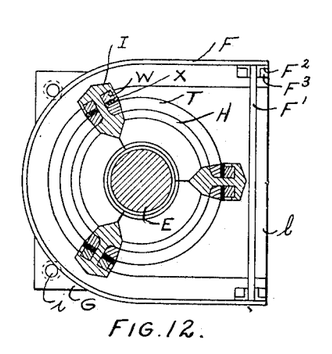
Fig. 12 is another form of cast mortar having the columns I and wall segments or curved side plates H cast integral with the base G, the section being through screen frames T.

In Fig. 12, the side plates H of the mortar and the columns I are formed integral, but the columns I are shown as terminating at a distance from the stamp so as not to form a stem guide, but far enough to form a partial support for the chock blocks, and also forming a dividing plate for the pulp and for the material as it is fed into the mortar. In all of the above described forms, the mortar side plate extends upwardly from the mortar base and is formed with a plurality of columns, which are flanged on each side to form ways for the reception of the screen frame, and also to form key-ways to receive the keys to hold the screen in place, said columns being preferably positioned as shown.

In a mill constructed as above described, it is evident that by feeding the ore entirely around the stamp instead of at one point, the stamp and die would be worn down more evenly and a greater quantity of ore can be crushed in a given length of time, because ore will pass in between the stamp and die substantially uniform from all directions, and thus the blow of the stamp upon such ore will be more evenly distributed and uniform, and a greater quantity of ore will be crushed at each blow. Where the ore is delivered at one side of the stamp the opposite side thereof might not be able to reach the ore between it and the disk at all, and thereby the crushing area between the stamp and the die would be decreased to that extent. In addition to this, the liability to the stamp stem being broken by the consequent strain of having more material under one side or edge than the other largely decreases, if not entirely avoids this by feeding the ore around the stamp. The lateral strain of the stem is also lessened, which would decrease the wear of its support in that direction and thereby add to the life of the bearing parts of the stamp stem.

By arranging the opening in the ore distributing or guiding chute eccentric to the stamp, a more even passage of the ore therethrough is secured, as the narrowest portion of the space between the guiding chute and stamp is placed nearest the feed or at the highest point of said guiding chute, which permits of the passage of the finer material, while the larger sizes will have to pass down and around the stamp until they reach a place where they can pass through into the mortar. Where the guide chute is arranged horizontal, it will be preferable to make its opening concentric with the stamp.

The usual past practice in feeding ore or like substances to mortars to be crushed upon a die M has been to feed through a box shaped receptacle, thus transmitting the ore to the die M, and by my invention it will be noticed that the ore is placed between the wall of mortar and the stamp, and all around the stamp. The feeding of the ore through a box shaped receptacle at one place breaks the screen at that place very quickly, with resultant time lost and expense in replacing.

It is also evident that by having the screens and screen frames substantially encircle the stamp, a greater discharge is secured and the capacity of the mill correspondingly increased; and by forming the chock-blocks in segmental layers, the screens and screen frames can be gradually lowered as the die wears down, thereby giving the greatest practical discharge possible, and by covering the top of the chock-block with an amalgamating plate, the amalgamation will be substantially the same during the life of the die.

Other advantages arise from the ease with which the parts may be removed for renewal on account of wear or of defective structure, and it permits of the parts of the mortar being taken apart for transportation after which they may be re-assembled for use. It will also permit of different portions of the mortar being made of different grades or qualities of material, as by making some of them of open-hearth flange steel, which is less subject to shock and consequent cracks than would be a complete cast-iron mortar; it would also give the same or greater strength with less weight of material. The strain upon the parts caused by unequal cooling in a complete cast-iron structure would be largely decreased, if not entirely eliminated by forming the mortar in sections.

The location of the columns or supports radially relatively to the mortar will cause them to act as divisions, whereby the pulp can be equally divided for screening, and by extending them in far enough they can act as guides for the boss-head and shoe, as they are reciprocated in the operation of the mill and thereby protect the upper part of the stamp from unnecessary vibration. The extended groove or key-seat in the outer portions of the columns affords such a long bearing that the wedge or key will not be so apt to be jarred or shaken loose by the action of the stamp; and by locating the hole or opening in the wall segments or side plates H through which the parts are removed or replaced to the rear or away from the front, the danger of contacting with or damaging the amalgamating plates in front, is avoided. It also permits of the parts that are being removed or replaced being transported by car or track, not shown, to the place intended.

By providing openings through which the process of feeding can be inspected from the front or sides of the mortar as well as from the rear, closer observation can be kept of it by the attendant and any irregularities corrected so as to keep the feed more regular. Owing to the location of the guiding chute and the passage of the ore between it and the stem, the splash of the mill above the ring would not be appreciable, and therefore the cover plate g for the mortar could be omitted.

In operation the parts are assembled and ore fed in upon the guiding chute from a source of supply, and from there it passes down into the mortar around the stamp, the reciprocation of the stamp through the guiding chute Z operating to force any ore through the said chute that might otherwise stick and clog up the feed. As soon as the ore has been pulverized and passed through the screen at any point around the mortar, it is carried by the launder around to the lip in front, from which it is discharged for waste or for subsequent treatment, as by amalgamating plates or concentrators, or for cyaniding.

By providing a mortar constructed with three columns it will be seen that this will give a rigid support preventing vibration, and at the same time giving a rear opening of sufficient size for enabling the placing and withdrawal of interior parts, said placing and withdrawal being desirable at the rear side away from the discharge.

My feeding system could be used in connection with two or more columns.

Having now described my invention, what I claim as new is:—

1. In a mortar for stamp mills, a stamp and a die therein, a ring at the upper portion of the mortar around the stamp extending in a plane inclined to the stamp and adapted to feed ore around the stamp.

2. In a stamp mill, a mortar, a stamp and a die therein, an inclined ring at the upper portion of the mortar around the stamp for feeding ore to the mortar, the opening in said ring being eccentric to the stamp.

3. In a stamp mill, the combination of an outer wall formed with a lateral discharge opening, a mortar wall within said outer wall and having three supporting columns, one of said columns being on the side toward said discharge opening and directly facing said opening, and said mortar wall being provided with a discharge opening between two of the supporting columns and on the side away from the discharge opening in the outer wall, said opening in the mortar wall being adapted for clean-out and removal of parts.

4. In a stamp mill mortar, a stamp therein, a downwardly inclined and downwardly tapering ore guiding chute ring surrounding the stamp to form an annular feed opening between the stamp and the ring.

5. A stamp mill mortar comprising a base and walls, said walls being concave on their inner faces, columns extending upwardly from the base and having portions extending inwardly from the walls of the mortar into proximity with the stamp to serve as guides for the stamp and to divide the mortar space and keep the material therein from moving around in the mortar, the said inwardly extending portions being separated at their inner ends to allow the material therebetween to come in contact with the stamps.

6. A stamp mill mortar comprising a base, circular walls extending upwardly from the base, columns extending upwardly from the base and having ribs extending inwardly from said circular walls into proximity with the stamp, and the walls between the columns having discharge openings at the lower ends thereof, giving a multiple discharge, the said inwardly extending ribs being separated at their inner ends to allow the material therebetween to come in contact with the stamps.

7. A mortar comprising a base, circular walls extending upwardly from the base and ribs extending inwardly from said circular walls between said walls dividing the mortar space into chambers, the walls having discharge openings for the respective chambers, the said inwardly extending ribs being separated at their inner ends to allow the material therebetween to come in contact with the stamps.

8. A mortar comprising a base, segmental walls extending upwardly therefrom, three columns extending upwardly therefrom and having stamp guide means extending inwardly from the circular walls, the three walls being removably secured to the columns and provided with discharge openings giving a triple discharge from the mortar.

9. A mortar comprising a base, three columns extending upwardly therefrom, each provided with a rib to divide the ore, walls between the columns having screen openings giving a triple discharge, screens in said openings, and a launder surrounding the mortar to receive the discharge from all of the walls, said launder discharging on the side directly opposite to one of the screens.

10. In a stamp mill mortar, a base, a wall consisting of segmental sections, rising therefrom and forming a die receiving chamber in combination with chock-blocks and screens, columns rising from said base and fastened thereto having in their sides, wall receiving grooves, chock-block receiving grooves and screen key seats for holding said screens in place.

11. In a stamp mill mortar, a base, a wall rising therefrom consisting of segmental sections, and forming a die receiving chamber, in combination with chock-blocks and screens, columns equidistantly spaced around such wall and rising therefrom, such columns being provided in their sides with means for retaining the wall sections of the mortar, means for holding such chock-blocks and screen retaining and fastening means.

12. In a stamp mill mortar, a base, a wall rising therefrom consisting of segmental sections, and forming a die receiving chamber, in combination with chock-blocks and screens, columns rising from said base and adapted and arranged to retain the wall sections of the mortar, means for seating and retaining said screens between the columns, and means above such screens to receive the ore at one side of the stamp and distribute the same entirely around the stamp.

13. In a mortar for stamp mills, a mortar, a stamp adapted to reciprocate in the mortar, ore feeding means arranged at the upper portion of the mortar, ore distributing means arranged below the ore feeding means and inclined to the stamp to receive the ore on one side of the stamp and distribute the same entirely around the stamp by the downward travel of the ore in such feeding means, the mortar having three openings below said distributing means, one of said openings being beneath the ore feeding means, and a launder surrounding the mortar to receive the discharge from all of said openings.

14. In a mortar for stamp mills, a base, a wall rising therefrom, columns arranged equidistant around the wall and rising therefrom and supported thereby, such columns being provided with means for seating the side walls, screens and chock-blocks of the mortar and also having flanges extending inwardly from such columns to form stamp guides, as and for the purpose described.

15. In a stamp mill mortar of the class described, a base, a wall rising therefrom to form a die receiving chamber, side wall retaining columns rising from said base, means in said columns for seating chock-blocks and screens, and means arranged above the screens to receive ore at one side of the mortar and conduct it downwardly and around the mortar, a launder on the base and around the mortar, a flange on the launder and a splash plate arranged in engagement with the flange.

16. In a stamp mill mortar, a base, a wall rising therefrom, in combination with chock-blocks and screens, columns projecting from said base and supported thereby, said columns having grooves, sheet metal side walls having bent over edges extending in said grooves and fastened to said columns, screen and chock-blocks holding means arranged to hold the screens and chock-blocks in their relation to the walls and columns.

17. A stamp mill mortar comprising a base, columns extending upwardly therefrom, removable superimposed chock-block sections between said columns, and means to fasten said chock-blocks between said columns.

18. A stamp mill mortar comprising a base, columns rising from said base, removable sectional chock-blocks between said columns, the sections of said chock-blocks being superimposed, means on said columns to hold the sections of said chock-blocks in place between said columns, and wall sections between said columns having openings for the removal of the sections of said chock-blocks.

19. A stamp mill mortar comprising a base, columns on said base, a plurality of superimposed removable chock-blocks between said columns, and fastening means in said columns for said chock-blocks.

20. In a stamp mill mortar, a base, a plurality of superimposed chock-blocks, a wall surrounding said chock-blocks and having openings, screens at said openings, and a plurality of superimposed sub-blocks below the respective screens.

21. In a mortar for stamp mills, the sides thereof being provided with perforated, longitudinal ribs and openings therebetween, segmental chock-blocks engaging with said ribs, pins through said openings for securing said chock-blocks in position, and segmental screens for covering the openings.

22. In a mortar for stamp mills, the sides thereof being provided with longitudinal ribs and openings therebetween, segmental chock-blocks, corresponding sub-blocks between said ribs, segmental screens resting on said sub-blocks, and wedges for securing said screens and sub-blocks in position.

23. In a mortar for stamp mills, the sides of which are provided with ribs and openings, removable chock-blocks within the mortar, screens between the ribs on the exterior of the mortar, said screens being of less area than the openings, removable sub-blocks for covering said openings below the screens, and segmental pieces for covering the openings above the screens, and wedges in said ribs for securing the screens and their appurtenances in position.

24. In a mortar for stamp mills, a base provided with a recess in its upper end, a die therein, a wearing-plate between said die and the inner walls of said recess, supports extending from said base upward, the inner face of each of which extends inward to form a guide and is undercut so as to overhang said ring, side pieces secured to said supports, and segmental chock-blocks, screens and appurtenances.

25. In a mortar for stamp mills, the sides thereof being provided with longitudinal ribs and openings therebetween, segmental chock-blocks, corresponding sub-blocks between said ribs, segmental screens resting on said sub-blocks, wedges for securing said screens and sub-blocks in position, and wearing-plates on said screens and sub-blocks for engaging the said wedges.

26. A circular mortar for stamp mills having its walls provided with three inwardly-extending ribs and being cut away therebetween, the inner face of two of said ribs being recessed, a die in said mortar of less diameter than the distance between the said recessed portions, and segmental chock-blocks, screens and appurtenances.

In testimony whereof I have signed my name to this specification in the presence of two subscribing witnesses.

EDWARD HENRY MOYLE.

Witnesses:
G. H. HOOPER,
J. E. SCHWENG.

Copies of this patent may be obtained for five cents each, by addressing the "Commissioner of Patents. Washington, D. C."

It is hereby certified that in Letters Patent No. 1,121,117, granted December 15, 1914, upon the application of Edward Henry Moyle, of Los Angeles, California, for an improvement in "Mortars for Stamp-Mills," an error appears in the printed specification requiring correction as follows: Page 1, line 93, for the word "core" read *ore;* and that the said Letters Patent should be read with this correction therein that the same may conform to the record of the case in the Patent Office.

Signed and sealed this 9th day of March, A. D., 1915.

[SEAL.]

J. T. NEWTON,

*Acting Commissioner of Patents.*